United States Patent
Karas et al.

[15] 3,663,238
[45] May 16, 1972

[54] VANILLA BEAN DRYING AND CURING

[72] Inventors: Albert J. Karas; Richard L. Hall; William H. Stahl, all of Baltimore, Md.

[73] Assignee: McCormick & Company, Incorporated, Baltimore, Md.

[22] Filed: Mar. 27, 1968

[21] Appl. No.: 716,499

[52] U.S. Cl. ..........................................99/140 R
[51] Int. Cl. ..........................................A23l 1/22
[58] Field of Search....................................99/140

[56] References Cited

UNITED STATES PATENTS 2,621,127   12/1952   Towt......................................99/140
3,352,690   11/1967   Kaul......................................99/140

*Primary Examiner*—Joseph Scovronek
*Assistant Examiner*—Warren Bovee
*Attorney*—Cushman, Darby & Cushman

[57] ABSTRACT

Green vanilla beans are chopped into approximately one-half inch lengths, cured for about 70–78 hours in perforated trays within a closed tank maintained at about 140° F., exudate being returned to the beans; dried in a rotary forced air, hot water jacketed drier at about 140° F. until reduced to about 35–40 percent moisture by weight, transferred to a conditioner and dried more slowly with air at room temperature and humidity until reduced to about 20–25 percent moisture content by weight.

6 Claims, 2 Drawing Figures

PATENTED MAY 16 1972          3,663,238

INVENTORS
ALBERT J. KARAS
RICHARD L. HALL
WILLIAM H. STAHL
BY Cushman Darby & Cushman
ATTORNEYS

ID="1" />

VANILLA BEAN DRYING AND CURING

BACKGROUND AND SUMMARY OF THE INVENTION

Vanilla beans require about 6 months to become fully grown or developed on the vine. During this growing stage the beans are green in color. At the end of the growing stage, while still green in color, the beans are harvested and sometimes referred to as "blossom-end yellow" or "mature." After harvesting, it is conventional to cure the beans. During the curing cycle, regardless of the method used, the beans turn from green to brown. Thus a "green" vanilla bean is a harvested, "mature" bean which has not yet been cured.

After curing and drying, vanilla beans may be ground and the particulate material used as food flavoring, for instance in vanilla flavored ice cream or vanilla flavored granulated sugar; or the dried and cured beans may be ground and vanillin and other flavoring constituents extracted there-from in conventional liquid extraction processes.

The present invention has no particular concern with the growing or picking of the beans or with their use in the preparation of an extract. The present invention is concerned with providing consistent high quality dried and cured vanilla bean of improved vanillin content.

The commonly assigned, earlier U.S. Pat. No. 2,621,127 of Towt contains at column 1, lines 14–36, a good discussion of two variants of conventional curing processes and goes on to disclose a more rapid process wherein the green beans are pulped, heated in pressurized air while being agitated and dried to desired moisture content, the whole process requiring much less time than the then conventional processes. By this reference the entire disclosure of the Towt patent is intended to be incorporated herein.

While the Towt process represented a vast saving of time, effort and equipment hold up over the then conventional processes and provided a uniform output, it has been determined that the amount and quality of vanillin and other desired flavoring materials obtainable from vanilla bean puree dried and cured according to the Towt process are about the same as, or lower than, the amount and quality obtainable from conventionally cured beans. In addition, the puree has been found to be difficult to handle, doesn't look like vanilla beans, is susceptible of hard-to-detect adulteration and portions of the puree may be lost during processing. Thus this prior art process has disadvantages as well as advantages, which fact has led to research directed to providing a process for drying and curing vanilla beans more quickly than old conventional methods, while preserving the beans in an easily handled form, recognizable as vanilla beans, and improving the quality and quantity of vanillin and other desired flavoring materials recoverable from the dried and cured beans.

In carrying out the preferred embodiment of the present invention, the green vanilla beans are chopped into approximately one-half inch lengths, cured for about 70 – 78 hours in perforated trays within a closed tank maintained at about 140° F., exudate being returned to the beans; dried in a rotary forced air, hot water jacketed drier at about 140° F. until reduced to about 35 – 40 percent moisture by weight, transferred to a conditioner and dried more slowly with air at room temperature and humidity until reduced to about 20 – 25 percent moisture content by weight.

The principles of the invention will be further hereinafter discussed with reference to the drawing wherein a preferred embodiment is shown. The specifics illustrated in the drawing are intended to exemplify, rather than limit, aspects of the invention as defined in the claims.

IN THE DRAWING:

FIG. 1 is a schematic view of the steps of the process according to the preferred embodiment of the invention, also illustrating certain apparatus elements in schematic form; and FIG. 2 is a graphic view of the drying process comparing the process according to the preferred embodiment of the invention with another alternative.

DESCRIPTION OF THE PREFERRED EMBODIMENT

Figure 1:
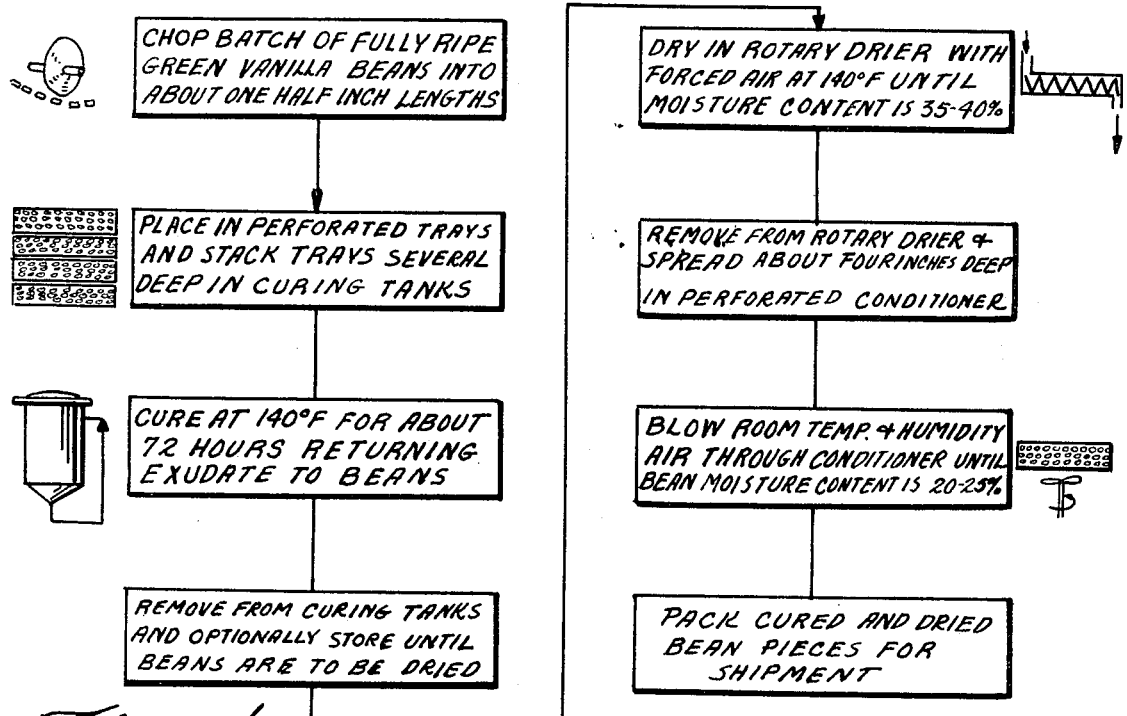

The vanilla beans are inspected for quality at the factory door, and if accepted are weighed in. It is essential that all beans are mature. (Immature beans, similarly processed separately, have given very inferior results, particularly in keeping qualities.) Beans which appear overripe, that is, split and blackened, may be used and appear to have no deleterious effect on the finished product. Beans left untreated until they have partially cured, turning brown as a result of not being processed within one or two days, have been treated separately. The latter showed a good vanillin content and may be conventionally extracted to produce acceptable vanilla extract having no off notes.

When a batch, for instance, 1,050 pounds of green beans, has been collected, the beans are conveyed to a bean cutter. If insufficient crop is coming in to make up a batch all at once, then manufacture takes place weekly. Keeping the green vanilla beans for this length of time before curing appears to have no adverse effect on the quality and quantity of output from the process of the invention.

The bean cutter chops the beans into lengths of one-half inch and delivers them directly to a curing tray. On the delivery side of the cutter the beans pass over a perforated sheet which allows some of the split pieces and ends to fall through. These are rejected. If cured the split pieces and ends have a very low vanillin content. In any case they make up by weight less than 0.25 percent of the vanilla. Apart from the above-mentioned perforated sheet which is galvanized, all surfaces with which the vanilla comes in contact until it is packed are of stainless steel.

The curing trays in the example under discussion are 6¾ inches deep and 36½ inches in diameter, the bottoms being perforated by three-sixteenths inch holes at 12 to the square inch. Each try holds about 150 pounds of cut green beans. The trays are stacked seven deep in a frame which is then lifted and carried by overhead runway and dropped into the curing tanks. The curing tanks are lined with stainless steel and are constructed of three-sixteenths inch mild steel plate. Each tank has a water jacket which is maintained at 140° F. There is a drain at the bottom of each tank, beneath which is suspended a stainless steel cup to catch any liquid from the beans. In fact, very little exudes during curing, perhaps one-half pint, but this has a strong odor of vanillin and is returned to the beans.

The tanks are closed during the curing process which typically lasts about 72 hours. The exact time does not appear very critical, as in practice it has ranged between 70 and 78 hours with no observable effect on the end product. At the end of curing the bean pieces have assumed a very deep brown color and are ready for transfer to the drier. This may be done immediately but if they are left alone for, for instance, about two days it appears to have no deleterious effect.

In developing the process according to the present invention, attempts were made to dry the cured bean pieces to 20 – 25 percent moisture content using a rotary drier having a water jacket which is maintained at 140° F. and a heat exchanger and fan by means of which air at 140° F. is blown through the drier. The temperature of the curing tanks and rotary drier water jackets, related as preferably being 140° F., may range between about 120 and 160° F. without producing deleterious results.

The great disadvantage of this was that it was very liable to overdry the beans, as the drying rate at this point is surprisingly rapid, as noted later herein, and the process difficult to control with the desired precision. Due to the fact that the rotary drier is heated by a water jacket, it was not possible to switch it off while a test was being made. By taking frequent readings it became clear that there is an initial stage in drying in the rotary drier in which very rapid moisture loss takes place, from 85 – 90 percent on entry, down to 70 – 75 percent in little more than an hour. It was thought probable that this represented surface moisture, easily lost. After this, there came a period in which a consistent 2½ – 3 percent an hour was lost, and this continued until the moisture content was 35 – 40 percent. This was thought to represent water which was less readily available, possibly because drying might be taking place only at the cut ends. At this stage there appeared a dramatic and sudden increase in the rate of drying, which returned to the initial rate of nearly 15 percent in an hour. This latter increase was unexpected, surprising and could not be predicated from conventional drying rate theory.

A study of how a solid dries may be based on the effect of the external conditions of temperature, humidity, air flow, etc., on the drying rate of the solid or on the internal mechanism of liquid flow.

Internal liquid flow may occur by several mechanisms, depending on the structure of the solid. The possible mechanisms are as follows:

1. Liquid Diffusion - in continuous homogeneous solids.
2. Vapor Diffusion - in any solid where heating takes place at one surface and drying at the other and where liquid is isolated between granules of solid.
3. Pressure Gradients Due to Shrinkage - in solids in which shrinkage occurs.
4. Capillary Flow - in granular and porous solids.
5. Electroosmosis.
6. Gravity.

In general, one mechanism predominates at a given time in a solid during drying, and it is not uncommon to find different times during the drying cycle.

Figure 2:
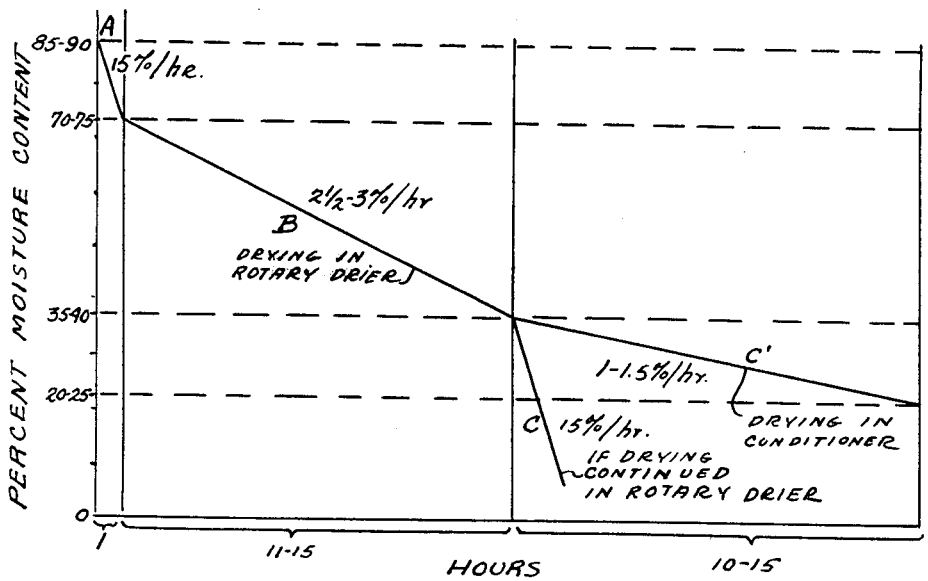

Considering the morphology of vanilla beans and the fact that both the internal and external structure of the bean pieces were exposed to the drying medium during the observation of the unusual drying rate, it seems unlikely that the drying mechanism thereof is completely divorced from chemical, biological, or biochemical phenomena, not presently fully understood. At least it is impossible to formulate with certainty a reasonable theory which would adequately and completely explain the rate of drying of vanilla beans based solely on the six internal mechanisms of liquid flow. However, interpretation of portions A and B (FIG. 2) of the drying cycle can be made in light of present understanding of drying.

The high rate of moisture loss observed the first hour of drying, portion A, may be explained as resulting from the evaporation of surface water. Most solids do experience a high constant rate of moisture loss at the beginning of the drying cycle and so the observed phenomena during portion A of drying process in the present instance is not at all unusual.

The succeeding hours, during which a slow constant rate of drying was observed, portion B, are probably due to moisture loss by liquid diffusion. This mechanism appears to be the most likely because approximately 80 per cent of the vanilla bean is a homogeneous solid which is a common medium for liquid diffusion. Also, most of the moisture which may be lost from the central portion of the bean (containing seeds and placental tissue) will enter the surrounding homogeneous portion (ovary wall) and so, too, be subject to the laws of liquid diffusion.

However, most solids experience a decrease in drying rate during comparable portions (i.e. to portion B) of their drying cycle. Therefore, an explanation of the observed constant drying rate of the vanilla bean must lie somewhere outside the realm of the internal mechanisms of liquid flow and include chemical, biological and biochemical factors presently not fully understood.

The high rate of drying which occurred at the end of the cycle (portion C) when conducted in an ADT drier may possibly be partially explained by two mechanisms. One possibility is that liquid is forced to the surface by a pressure gradient that results from shrinkage of the outer layers. The second possibility is that during drying the differences in moisture content throughout the volume of the bean causes tiny cracks in the bean which exposes relatively large pockets of moisture to the drying medium. If the vanilla bean possessed the drying characteristics of most solids, it would complete its drying cycle at a steadily decreasing rate. Therefore here, as concluded hereinbefore, it is necessary to conclude that a true explanation of the observed high drying rate during portion C requires the consideration of other presently difficult to assess factors besides liquid flow theory.

Since the drying rate of vanilla beans is unique in comparison to that of most other solids, complete and accurate theoretical interpretation is defied.

In addition to the difficulty in terminating the drying before the beans had become overdried, it appeared that other constituents besides water were being lost, leading to unfavorable, lower chemical constants in the dried bean product.

Accordingly, it has now been discovered that if, upon approach of the onset of the latter increased drying rate, the bean pieces are removed from the ADT drier and dried in circulated air at ambient temperature and humidity, a drying rate C' of about 1 – 1.5 percent moisture by weight can be established and maintained until the moisture content has been reduced to the desired 20 – 25 percent by weight. The 1 – 1.5 percent moisture removal per hour eliminates overdrying as a processing problem. Furthermore, as the following Table I indicates, the constants obtained when processing vanilla beans according to the present invention, show substantial improvement over comparable results from old conventional processes.

TABLE I

Analytical Constants on:

| | Uganda Grown Beans | | | Madagascar Grown Beans | |
|---|---|---|---|---|---|
| | New Process | Conventionally Cured | | Conventionally Cured | |
| | Avg. of 37 lots (1966-7) | One Lot Jan. '67 | One Lot Oct. '67 | Avg. of (n) Lots (1965-7) | |
| Total Solids (g/dl) | 3.70 | 3.22 | 3.53 | 3.5 | (30) |
| Vanillin (g/dl) | | | | | |
| Folin-Denis | 0.40 | 0.30 | 0.30 | 0.31 | (690) |
| Resin (g/dl) | 0.15 | 0.18 | 0.09 | 0.13 | (323) |
| Lead Number | 0.95 | 0.75 | 0.93 | 0.87 | (422) |

In the "New Process" example of Table I, the cured, partly dried bean pieces were removed from the rotary drier when their moisture content had been reduced to 35 – 40 percent by weight. These bean pieces were spread about 4 inches deep in a conditioner comprising a perforated tray through which air at room temperature and humidity were blown by a fan. The tray perforations accounted for about 25 percent of the area of the tray bottom and consisted of a plurality of seven thirty-seconds inch diameter holes. The fan moved about 3,000 CFM input air through the tray at room temperature and percentage humidity. Room temperature was approximately 86° F.; ambient air humidity was about 10 percent to 60 percent. It was found that to facilitate the taking of periodic bean pieces percentage moisture content data and obtaining results which were still pertinent, when the bean pieces percentage moisture content was nearing 20 – 25 percent, it was easy to turn off the conditioner fan until the test results were known, then turn it back on if need for further drying were indicated by the test results. This stopping and restarting of the conditioner appeared to cause no deleterious effects.

When the bean pieces had been dried to 20 – 25 percent moisture content by weight, they were removed from the conditioner and packed in sealed cans for shipment to a subsequent vanilla extraction process where the data of Table I was obtained.

It should be evident from the foregoing discussion of details of the present invention that the term "bean" has sometimes been applied to designate an approximately one-half inch long cut piece of bean. The intention is believed to be clear from the context in each instance.

By use of the term "cutting" to describe the action taken upon the green beans to cause them to become bean pieces no particular active mechanism is intended, the action words "severing," "slicing" or "chopping" would serve equally well to describe the active mechanism. Generally, the cuts proceed transversely of the long axes of the beans, although since no extra care is taken to maintain the beans exactly transverse to the cutter, some are cut on the bias into diamond shaped pieces without deleterious effect.

It should now be apparent that the vanilla bean drying and curing as described hereinabove possesses each of the attributes set forth in the specification under the heading "Background and Summary of the Invention" hereinbefore. Because the vanilla bean drying and curing of the invention can be modified to some extent without departing from the principles of the invention as they have been outlined and explained in this specification, the present invention should be understood as encompassing all such modifications as are within the spirit and scope of the following claims.

What is claimed is:

1. A process for drying and curing green vanilla beans comprising:

chopping the beans into pieces each about one-half inch long;

curing the bean pieces within an enclosed space at about 140° F. for about 70 – 78 hours;

drying the cured bean pieces with heated, forced air at about 140° F. until the moisture content thereof is about 35 – 40 percent by weight;

further drying said bean pieces in air at about room temperature and ambient percentage humidity at a rate which lowers the moisture content of said bean pieces about 1 – 1.5 weight percent per hour until the moisture content thereof is about 20 – 25 percent by weight and said bean pieces have a vanillin content of about 0.40 g/dl.

2. The process of claim 1 wherein step of curing said bean pieces includes: depositing the bean pieces in perforated trays; stacking said trays within a curing tank; catching liquid exudate from the beam pieces; and returning the exudate to the bean pieces.

3. The process of claim 1 wherein the further drying step includes: loading the bean pieces into perforated trays and blowing ambient air through said bean pieces and perforated trays.

4. The process of claim 3 wherein the substep of loading the bean pieces into perforated trays includes leveling off the bean pieces to a depth of about four inches in the trays.

5. A process for drying and curing green vanilla beans comprising:

cutting the beans into short pieces having sufficient length of about one-half inch, as to be easily recognizable as vanilla bean pieces and being sufficiently short that a substantial part of the exterior of the bean pieces consists of exposed seeds, placental tissue and ovary wall;

curing said bean pieces by enclosing the bean pieces and maintaining them at about 140° F. for about 70 – 78 hours;

drying the cured bean pieces in air at elevated temperature until the onset of a drying rate that is substantially increased from about 2.5 – 3 percent per hour to about 15 percent per hour;

further drying said cured bean pieces in room temperature air at ambient humidity at a rate which lowers the moisture content of said bean pieces about 1 – 1.5 weight percent per hour to a moisture content of 20 – 25 percent moisture by weight and said bean pieces have a vanillin content of about 0.40 g/dl.

6. The process of claim 5 including the further step of packing the dried, cured bean pieces in containers and sealing said containers.

* * * * *